United States Patent
Sakata et al.

(10) Patent No.: US 8,209,966 B2
(45) Date of Patent: Jul. 3, 2012

(54) EXHAUST EMISSION CONTROL DEVICE FOR INTERNAL COMBUSTION

(75) Inventors: Masakazu Sakata, Obu (JP); Masatoshi Maruyama, Nagoya (JP); Osamu Shimomura, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 385 days.

(21) Appl. No.: 12/465,958

(22) Filed: May 14, 2009

(65) Prior Publication Data
US 2009/0288396 A1 Nov. 26, 2009

(30) Foreign Application Priority Data
May 22, 2008 (JP) .................. 2008-134568

(51) Int. Cl.
*F01N 3/00* (2006.01)
(52) U.S. Cl. .................... 60/295; 60/311
(58) Field of Classification Search ......... 60/286, 60/295, 299, 301
See application file for complete search history.

(56) References Cited

U.S. PATENT DOCUMENTS

| | | | |
|---|---|---|---|
| 5,746,052 A | 5/1998 | Kinugasa et al. | |
| 7,178,328 B2 * | 2/2007 | Solbrig | 60/286 |
| 7,610,752 B2 * | 11/2009 | Dalla Betta et al. | 60/286 |
| 2003/0182935 A1 | 10/2003 | Kawai et al. | |
| 2006/0201139 A1 * | 9/2006 | Khadiya | 60/286 |
| 2007/0110643 A1 * | 5/2007 | Sobolevskiy et al. | 422/177 |
| 2007/0245714 A1 * | 10/2007 | Frazier et al. | 60/276 |

FOREIGN PATENT DOCUMENTS

| | | |
|---|---|---|
| DE | 199 06 344 | 8/2000 |
| JP | 3-129712 | 12/1991 |
| JP | 9-000870 | 1/1997 |
| JP | 2001-129354 | 5/2001 |
| JP | 2002-250220 | 9/2002 |
| JP | 2003-269142 | 9/2003 |
| JP | 2003269142 A * | 9/2003 |
| JP | 2003-293743 | 10/2003 |
| JP | 2007-255345 | 10/2007 |
| JP | 2007255345 A * | 10/2007 |

OTHER PUBLICATIONS

Japanese Office Action dated Feb. 23, 2010, issued in corresponding Japanese Application No. 2008-134568, with English translation.
German Office Action dated Jul. 12 2010, issued in corresponding German Application No. 10 2009 003 293.2-13, with English translation.
Japanese Office Action dated Nov. 9, 2010, issued in corresponding Japanese Application No. 2008-134568, with English translation.

* cited by examiner

*Primary Examiner* — Thomas Denion
*Assistant Examiner* — Patrick Maines
(74) *Attorney, Agent, or Firm* — Nixon & Vanderhye P.C.

(57) ABSTRACT

An exhaust emission control device is used for an engine and is applied to an exhaust gas purifying system. The system has an NOx catalyst disposed in an exhaust passage of the engine to promote selective purification of NOx in exhaust gas performed by ammonia, which is a reducing agent for reducing NOx, and a reducing agent adding device for adding the reducing agent to an upstream side of the catalyst in a flow direction of exhaust gas. The device includes a catalyst temperature detecting device for detecting temperature of the catalyst, a reaction ratio calculating device for calculating a reaction ratio, which is a ratio of a reaction amount of ammonia to a reaction amount of NOx in the catalyst, based on the temperature of the catalyst, and an ammonia consumed amount calculating device for calculating a consumed amount of ammonia in the catalyst based on the reaction ratio.

8 Claims, 5 Drawing Sheets

EXHAUST EMISSION CONTROL DEVICE FOR INTERNAL COMBUSTION

CROSS REFERENCE TO RELATED APPLICATION

This application is based on and incorporates herein by reference Japanese Patent Application No. 2008-134568 filed on May 22, 2008.

BACKGROUND OF THE INVENTION

1. Field of the Invention

The present invention relates to an exhaust emission control device for an internal combustion engine, and is suitably applied particularly to an exhaust gas purifying system, which employs a selective reduction catalyst (SCR: Selective Catalytic Reduction) for selectively purifying NOx (nitrogen oxide) in exhaust gas by ammonia as a reducing agent. This system is generally known as a urea SCR system because urea water solution is used as a reducing agent.

2. Description of Related Art

Recent years, a urea SCR system is being developed as an exhaust gas purifying system which purifies NOx in exhaust gas at a high purifying rate in an engine (particularly a diesel engine) applied to a vehicle or the like, and some of such a system has been put in practical use. The following configuration is known as a urea SCR system. In the urea SCR system, a selective reduction NOx catalyst is provided in an exhaust pipe connected to an engine main body, and a urea water addition valve for adding urea water as a NOx reducing agent (urea water solution) to the inside of the exhaust pipe is provided on an upstream side of the NOx catalyst.

In the above-described system, by supplying urea water to the inside of the exhaust pipe through the urea water addition valve, NOx in exhaust gas is selectively reduced and removed on the NOx catalyst. In time of the reduction of NOx, ammonia (NH3) is generated through the hydrolyzation of urea water by exhaust heat, and by adsorption of the ammonia to the NOx catalyst and reduction reaction on the NOx catalyst based on ammonia, NOx is reduced and purified.

NO (nitrogen monoxide) and NO2 (nitrogen dioxide) are contained in NOx in exhaust gas. Control of an amount of urea water added and supplied to exhaust gas in accordance with proportion between an amount of NO and an amount of NO2 is proposed. For instance, in an exhaust gas purification unit for diesel engines described in Japanese Unexamined Patent Application Publication No. 2002-250220, proportion of NO/NO2 in exhaust gas is calculated based on outlet temperature of a DPF (Diesel Particulate Filter) as a particulate matter reduction device, and based on the proportion of NO/NO2, an amount of urea supplied to the NOx catalyst is controlled.

According to the invention in the above Publication No. 2002-250220, the amount of urea is controlled in view of components of exhaust gas (proportion of NO/NO2) flowing into the NOx catalyst. In actual NOx purification in the NOx catalyst, it seems that not only the component of inflow gas, but also what kind of NOx reaction is caused on the catalyst needs to be considered. More specifically, chemical reactions differ between NO and NO2 in the NOx catalyst, and thus it may be necessary to consider which component is reduced and purified.

Furthermore, during actual chemical reaction in the NOx catalyst, a chemical reaction which reduces NO and NO2 at the same time (see (formula 1) discussed below) is produced, in addition to a chemical reaction which reduces NO (see (formula 2) discussed below) and a chemical reaction which reduces NO2 (see (formula 3) discussed below). Accordingly, even if the ratio of NO/NO2 of inflow gas is constant, a consumed amount of ammonia (i.e., amount of ammonia which reacts with NOx) may vary with a generation ratio of each chemical reaction or the like. Therefore, a difference of control is caused in an ammonia adsorbed amount and as a result, NOx purification performance may deteriorate.

SUMMARY OF THE INVENTION

The present invention addresses the above disadvantages. Thus, it is a main objective of the present invention to provide an exhaust emission control device for an internal combustion engine which improves accuracy in estimation of an ammonia consumed amount in a NOx catalyst and eventually optimizes NOx purification.

To achieve the objective of the present invention, there is provided an exhaust emission control device used for an internal combustion engine and applied to an exhaust gas purifying system. The system has an NOx catalyst and a reducing agent adding means. The NOx catalyst is disposed in an exhaust passage of the engine, through which exhaust gas flows, so as to promote selective purification of NOx in the exhaust gas performed by ammonia, which is a reducing agent for reducing NOx. The reducing agent adding means is for adding the reducing agent to an upstream side of the NOx catalyst in a flow direction of the exhaust gas. The device includes a catalyst temperature detecting means, a reaction ratio calculating means, and an ammonia consumed amount calculating means. The catalyst temperature detecting means is for detecting temperature of the NOx catalyst. The reaction ratio calculating means is for calculating a reaction ratio, which is a ratio of a reaction amount of ammonia to a reaction amount of NOx in the NOx catalyst, based on the temperature of the NOx catalyst detected by the catalyst temperature detecting means. The ammonia consumed amount calculating means is for calculating a consumed amount of ammonia in the NOx catalyst based on the reaction ratio calculated by the reaction ratio calculating means.

To achieve the objective of the present invention, there is also provided an exhaust emission control device used for an internal combustion engine and applied to an exhaust gas purifying system. The system has an NOx catalyst and a reducing agent adding means. The NOx catalyst is disposed in an exhaust passage of the engine, through which exhaust gas flows, so as to promote selective purification of NOx in the exhaust gas performed by ammonia, which is a reducing agent for reducing NOx. The reducing agent adding means is for adding the reducing agent to an upstream side of the NOx catalyst in a flow direction of the exhaust gas. The device includes an NO/NO2 calculating means, a reaction ratio calculating means, and an ammonia consumed amount calculating means. The NO/NO2 calculating means is for calculating an NO/NO2 ratio, which is a ratio between NO and NO2 in the exhaust gas. The reaction ratio calculating means is for calculating a reaction ratio, which is a ratio of a reaction amount of ammonia to a reaction amount of NOx in the NOx catalyst, based on the NO/NO2 ratio calculated by the NO/NO2 calculating means The ammonia consumed amount calculating means is for calculating a consumed amount of ammonia in the NOx catalyst based on the reaction ratio calculated by the reaction ratio calculating means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
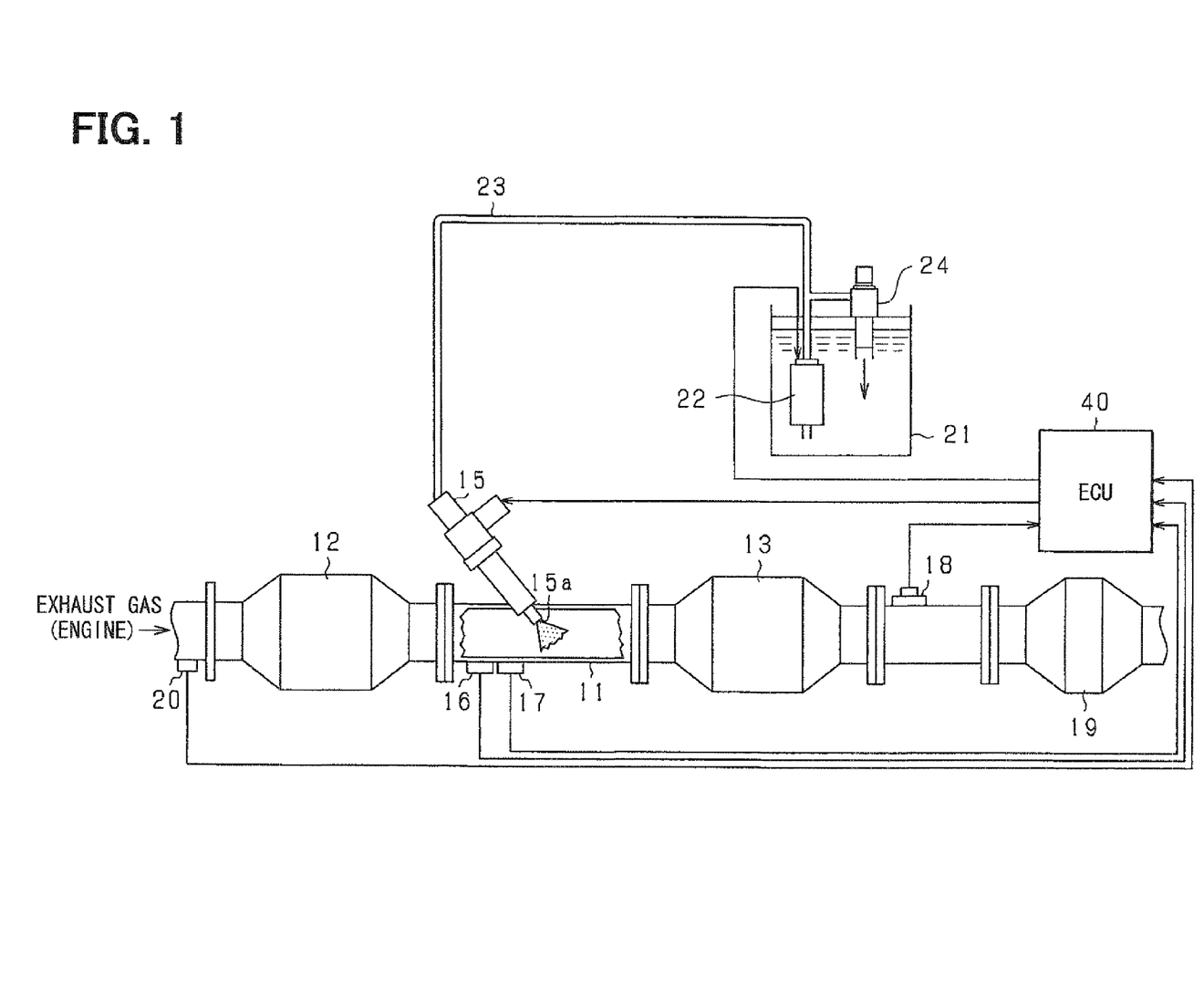
FIG. 1 is a schematic diagram illustrating a configuration of an exhaust gas purifying system according to an embodiment of the invention.

An embodiment, in which an exhaust emission control device according to the invention is embodied, is described below with reference to the drawings. The exhaust emission control device of the present embodiment purifies NOx in exhaust gas using a selective reduction catalyst, and is configured as a urea SCR system. A configuration of the system is described in detail with reference to FIG. 1. FIG. 1 is a schematic diagram illustrating the urea SCR system according to the present embodiment. The system includes various actuators for purifying exhaust gas, various sensors, and ECU (electronic control unit) 40, with exhaust gas that is discharged from a diesel engine (not shown) in a vehicle being an object for purification.

As a configuration of an engine exhaust system, an oxidation catalyst 12 and a selective reduction catalyst (hereinafter referred to as an SCR catalyst) 13 are disposed in this order from an upstream side in an exhaust pipe 11 which is connected to an engine main body (not shown) and defines an exhaust passage. A urea water addition valve 15 for adding and supplying urea water (urea water solution) as a reducing agent into the exhaust pipe 11 is provided between the oxidation catalyst 12 and the SCR catalyst 13 in the exhaust pipe 11. Also, an NOx sensor 16 and a temperature sensor 17 are provided between the oxidation catalyst 12 and the SCR catalyst 13. An NOx sensor 18 is provided on a downstream side of the SCR catalyst 13 in the exhaust pipe 11. The NOx sensor 16 detects NOx concentration in exhaust gas on an upstream side of the SCR catalyst 13, and the NOx sensor 18 detects NOx concentration in exhaust gas on the downstream side of the SCR catalyst 13. In the following description, the NOx sensor 16 is referred to also as an "upstream NOx sensor", and the NOx sensor 18 is referred to also as a "downstream NOx sensor".

An oxidation catalyst 19 is provided on a further downstream side of the SCR catalyst 13 in the exhaust pipe 11 as an ammonia removal device for removing ammonia (NH3) discharged from the catalyst 13, i.e., surplus ammonia. In addition, a temperature sensor 20 for detecting temperature of exhaust gas discharged from the engine main body is provided on an upstream side of the oxidation catalyst 12 in the exhaust pipe 11.

In the configuration of the exhaust system described above, exhaust gas discharged from the engine main body passes through the oxidation catalyst 12, and meanwhile, NO (nitrogen monoxide) in exhaust gas is converted into NO2 (nitrogen dioxide) due to an oxidation effect of the oxidation catalyst 12. After that, NOx reduction by ammonia is performed in the SCR catalyst 13. Details of the NOx reduction are described hereinafter.

The oxidation catalyst 12 may be provided integrally with a DPF (Diesel Particulate Filter) as a PM (particulate matter) removal unit. In this case, the oxidation catalyst 12 is integrated by providing the oxidation catalyst 12 on an upstream side of the DPF, or by supporting platinum or the like on a cell surface of the DPF with the DPF serving as a carrier. The DPF is a continuous recovery-type PM removal filter for capturing PM in exhaust gas-PM captured by the DPF is combusted and removed (corresponding to recovery treatment) by, for example, post injection after main fuel injection in a diesel engine and thereby the DPF is continuously used.

The SCR catalyst 13 promotes reduction reaction of NOx (exhaust gas purification reaction), and promotes the following reaction so as to reduce NOx in exhaust gas.

NO+NO2+2NH3→2N2+3H2O　　　(formula 1)

4NO+4NH3+O2→4N2+6H2O　　　(formula 2)

6NO2+8NH3→7N2+12H2O　　　(formula 3)

In these reactions, a urea water addition valve 15 provided on the upstream side of the SCR catalyst 13 adds and supplies ammonia (NH3) serving as a reducing agent of NOx.

The urea water addition valve 15 is configured generally similar to an existing fuel injection valve (injector) for gasoline injection and may employ a widely known configuration. Accordingly, its configuration is briefly explained below. The urea water addition valve 15 is configured as an electromagnetic opening and closing valve including a driving unit that has an electromagnetic solenoid and the like and a valve body part that has a needle for opening and closing a front end nozzle hole part. The urea water addition valve 15 is opened or closed based on an injection driving signal from the ECU 40. More specifically, upon energization of the electromagnetic solenoid based on the injection driving signal, the needle moves in a valve opening direction in accordance with the energization, and urea water is added (injected) through a front end nozzle hole part 15a.

Urea water is supplied sequentially to the urea water addition valve 15 from a urea water tank 21, and a configuration of a urea water supply system is described below.

The urea water tank 21 is configured as an airtight container having a supplying cap, and predetermined concentration (32.5%) of urea water is stored therein. The urea water pump 22 is provided in the urea water tank 21 with the pump 22 immersed in urea water. The urea water pump 22 is an electric pump which is rotated by a driving signal from the ECU 40. One end of a urea water supply pipe 23 is connected to the urea water pump 22, and the other end of the urea water supply pipe 23 is connected to the urea water addition valve 15. A urea water passage is defined by the urea water supply pipe 23. When the urea water pump 22 is rotated, urea water is pumped up, and the urea water is discharged into the urea water addition valve 15 side through the urea water supply pipe 23.

The urea water pump 22 is, for example, a turbine type pump having an electric motor as a driving source. An impeller of the pump 22 rotates in accordance with drive of the electric motor and, urea water is pressure-fed through many vane grooves formed in an outer peripheral part of the impeller. Other pumps such as a rotor type pump may be used as the urea water pump 22. A pressure regulating valve 24 for regulating pressure of urea water is provided in the present system, and delivery pressure of the urea water pump 22 is appropriately regulated by the pressure regulating valve 24. In addition, a filter (not shown) for filtering urea water is provided at a discharge opening portion of the urea water pump 22. Urea water discharged sequentially is delivered to the urea water supply pipe 23 after removal of foreign substances through the filter.

In the above-described system, the ECU 40 actively carries out control related to exhaust gas purification as an electronic control unit. The ECU 40 has a widely known microcomputer (not shown), and operates various actuators such as the urea water addition valve 15 in a desired mode based on detection values of various sensors. Accordingly, the ECU 40 performs various kinds of control related to exhaust gas purification. More specifically, by controlling, for example, an energization period (valve opening time) of the urea water addition valve 15 or a driven amount of the urea water pump 22, the ECU 40 adds and supplies a proper amount of urea water into the exhaust pipe 11 at an appropriate time.

In the above-described system of the present embodiment, when the engine is in operation, urea water in the urea water tank 21 is pressure-fed to the urea water addition valve 15 through the urea water supply pipe 23 as a result of the drive of the urea water pump 22 and then, urea water is added and supplied to the inside of the exhaust pipe 11 by the urea water addition valve 15. Accordingly, urea water is supplied to the SCR catalyst 13 together with exhaust gas in the exhaust pipe 11, and the exhaust gas is purified through the reduction reaction of NOx in the SCR catalyst 13. In time of the reduction of NOx, ammonia (NH3) is generated as a result of the hydrolyzation of urea water by exhaust heat by, for example, a reaction such as (NH2)2CO+H2O→2NH3+CO2    (formula 4)

Then, ammonia is adsorbed to the SCR catalyst 13, and NOx in exhaust gas is selectively reduced removed by ammonia in the SCR catalyst 13. In other words, as a result of the reduction reaction (above reaction formulas 1 to 3) based on the ammonia on the SCR catalyst 13, NOx is reduced and purified.

A urea addition amount through the urea water addition valve 15 may be measured based on an amount of ammonia adsorbed each time in the SCR catalyst 13. In the present embodiment, a difference (balance of the ammonia amount) between an ammonia supply amount and an ammonia consumed amount in the SCR catalyst 13 is calculated, and the ammonia adsorbed amount is calculated based on the difference. In such a case, the ammonia supply amount is calculated from a urea water addition amount by the urea water addition valve 15. The ammonia consumed amount is calculated based on a reaction ratio Rre which expresses a ratio of a reaction amount of NH3 to an NOx reaction amount in the SCR catalyst 13, and an NOx purified amount (actual NOx reaction amount) in the SCR catalyst 13.

The reaction ratio Rre is supplementarily described below. The reaction ratio Rre is a reaction mole ratio (NH3/NOx) between NOx and ammonia when NOx in exhaust gas is reduced by ammonia, and the reaction mole ratio varies according to an occurrence ratio of the chemical reactions in accordance with the above three reaction formulas 1 to 3. The chemical reactions by (formula 1) to (formula 3) are not caused always at a constant rate. A rate of each chemical reaction varies according to temperature of the SCR catalyst 13 each time.

Figure 2:
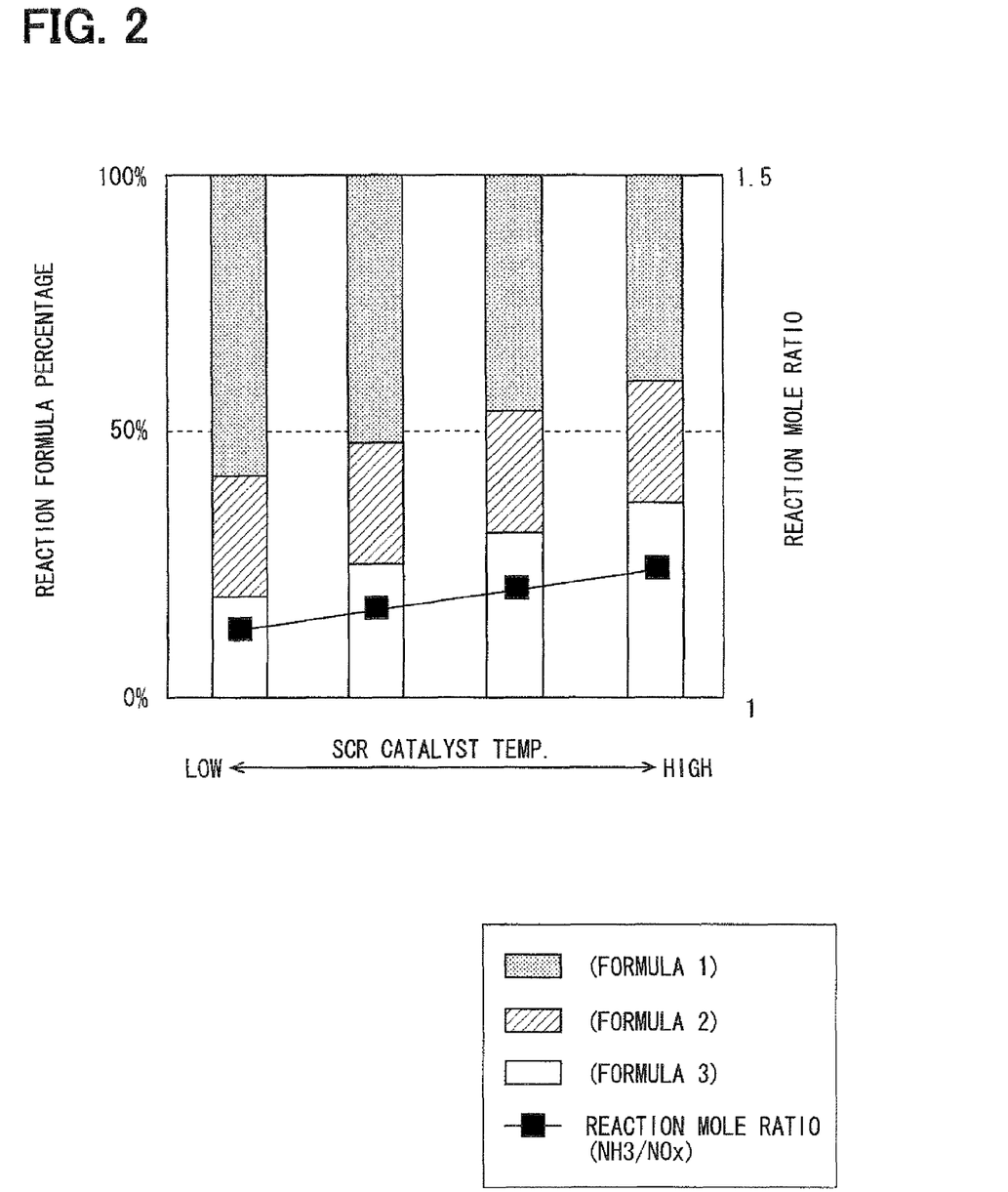
FIG. 2 is a graph illustrating a percentage of each reaction formula and a reaction mole ratio with respect to SCR catalytic temperature according to the embodiment.

FIG. 2 illustrates a ratio (reaction formula percentage) of each reaction formula of (Formula 1) to (formula 3) with respect to the SCR catalytic temperature, and the reaction mole ratio with respect to the SCR catalytic temperature. In FIG. 2, the reaction formula percentage at every predetermined SCR catalytic temperature is illustrated with a vertically long percentage bar chart, and the reaction mole ratio at each SCR catalytic temperature is illustrated with a line graph.

As shown in FIG. 2, as the SCR catalytic temperature becomes higher, a percentage of (formula 1) decreases and a percentage of (formula 3) increases. This characteristic is because chemical reactions based on the above three reaction formulas differ in their reaction temperatures, and the chemical reaction by (formula 3) is more easily caused as the SCR catalytic temperature is higher. In such a case, individual reaction mole ratios in each reaction formula of (formula 1) to (formula 3) are (formula 1) is 1(=2 mol/2 mol), (formula 2) is 1(=4 mol/4 mol), and (formula 3) is 1.333(=8 mol/6 mol), and the overall reaction mole ratio changes in accordance with a change of the reaction formula percentage. To sum up, as the SCR catalytic temperature becomes higher, a reaction percentage of (formula 3) increases, and accordingly, the reaction mole ratio increases (the same holds for the reaction ratio Rre).

In the selective reduction NOx catalyst for selectively purifying NOx by the ammonia used as a reducing agent, the reaction between NOx and ammonia (NH3) is produced mainly based on each reaction formula of (formula 1) to (formula 3). A chemical reaction based on each reaction formula is different in their reaction temperatures, and accordingly, the percentage of the reaction formula differs in accordance with the temperature of the NOx catalyst. In such a case, for instance, the reaction ratio (i.e., mole ratio between NOx and NH3) which is a ratio of the ammonia reaction amount to the NOx reaction amount in the NOx catalyst is different between the reactions by (formula 1), (formula 2) and the reaction by (formula 3). Accordingly, when the temperature of the NOx catalyst is different, the amount of ammonia used for NOx purification with respect to the amount of NOx in exhaust gas is different.

In the present embodiment, focusing on the characteristic that the reaction ratio Rre (reaction mole ratio between NOx and ammonia) is not always constant but varies with the SCR catalytic temperature, the reaction ratio Rre is calculated based on the SCR catalytic temperature, and based on the reaction ratio Rre, the ammonia consumed amount (amount of NH3 used for NOx reduction) in the SCR catalyst 13 is calculated. Consequently, the present embodiment aims to accurately estimate the ammonia adsorbed amount in the SCR catalyst 13.

Moreover, in the present embodiment, a ratio of NO/NO2 in exhaust gas is used as a parameter for calculating the reaction ratio Rre in addition to the SCR catalytic temperature. The ratio of NO/NO2 in exhaust gas varies in accordance with a state of the oxidation catalyst 12 on the upstream side of the SCR catalyst 13 and the like, and the reaction ratio Rre varies with a change of the ratio of NO/NO2. The reason why the reaction ratio Rre changes according to the ratio of NO/NO2 is because the respective reaction mole ratios between NO and NO2, and NH3 are different between the above (formula 2) which is a reaction formula of NO and the above (formula 3) which is a reaction formula of NO2. In this case, as the oxidation catalyst 12 has higher temperature, an oxidation reaction NO→NO2 is more activated, so that the ratio of NO/NO2 becomes smaller. In the present embodiment, using this relationship, the ratio of NO/NO2 is calculated based on, for example, temperature of the oxidation catalyst 12. In addition, the ratio of NO/NO2 is calculated as the ratio of NO/NO2 of gas introduced into the SCR catalyst 13.

In an exhaust gas purifying system having an oxidation catalyst on the upstream side of the NOx catalyst, as the temperature of the oxidation catalyst becomes higher because, for example, exhaust gas temperature becomes higher, the oxidation reaction (i.e., reaction which converts NO into NO2) in the oxidation catalyst is further promoted, and thereby the ratio of NO/NO2 becomes small. In other words, the ratio of NO/NO2 changes in accordance with the temperature of the oxidation catalyst. Therefore, the temperature of the oxidation catalyst is detected, and the ratio of NO/NO2 may be calculated based on the oxidation catalyst temperature. Accordingly, the ratio of NO/NO2 is correctly obtained, and eventually, calculation accuracy for the reaction ratio in the NOx catalyst (ratio of the ammonia reaction amount to the NOx reaction amount) is further improved.

Figure 3:
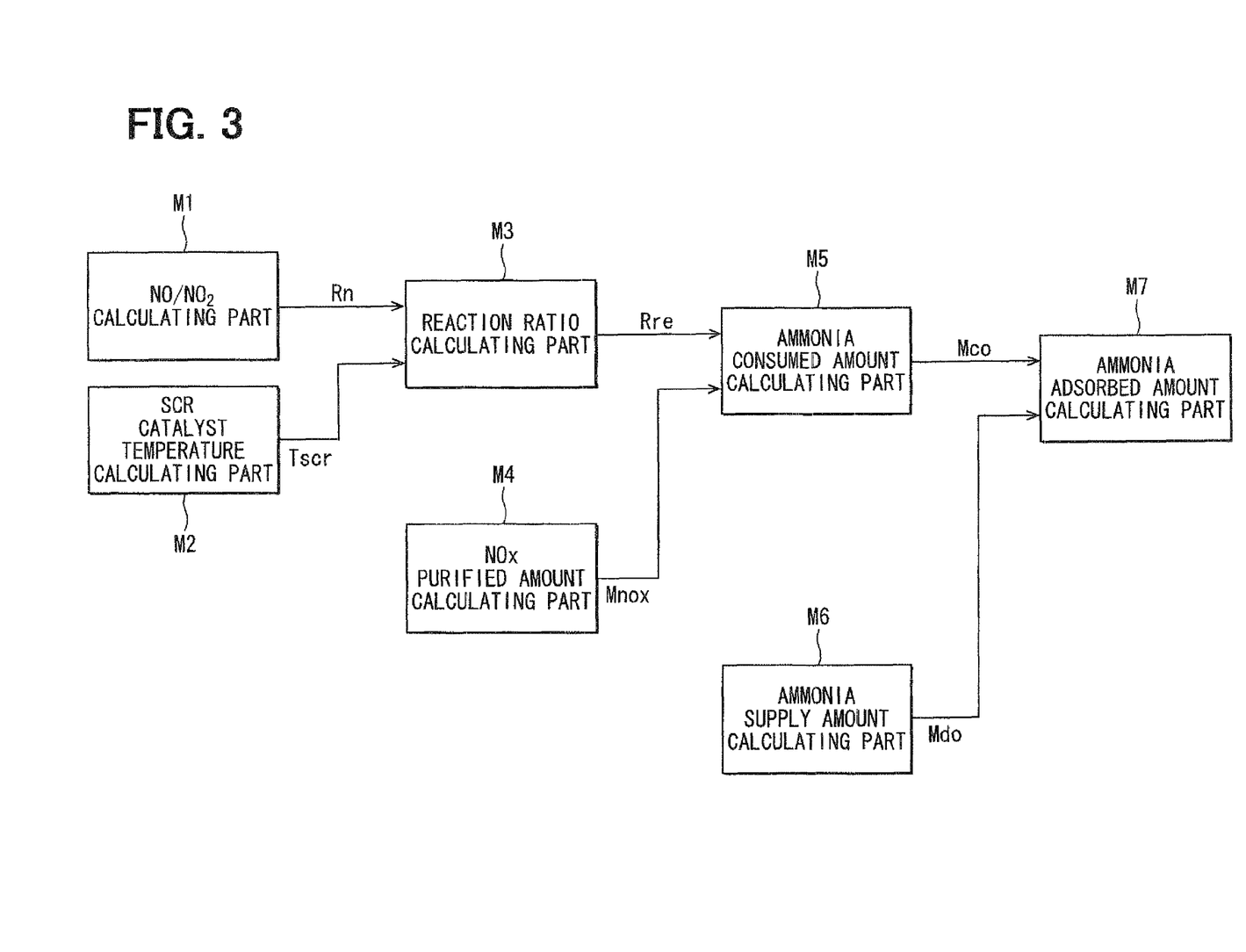
FIG. 3 is a functional block diagram associated with calculation of an ammonia adsorbed amount in an SCR catalyst according to the embodiment.

FIG. 3 is a functional block diagram illustrating calculation functions for calculating the ammonia adsorbed amount in the SCR catalyst 13. Each block in FIG. 3 is embodied as calculation functions by the ECU 40.

As shown in FIG. 3, as the calculation function for the ammonia adsorbed amount, the ECU 40 includes an NO/NO2 calculating part M1 for calculating a ratio Rn of NO/NO2 of exhaust gas, an SCR catalyst temperature calculating part M2 for calculating SCR catalytic temperature Tscr which is the temperature of the SCR catalyst 13, a reaction ratio calculating part M3 for calculating the reaction ratio Rre based on the ratio Rn of NO/NO2 calculated at the NO/NO2 calculating part M1 and the SCR catalytic temperature Tscr calculated at the SCR catalyst temperature calculating part M2, an NOx purified amount calculating part M4 for calculating an NOx purified amount Mnox in the SCR catalyst 13, an ammonia consumed amount calculating part M5 for calculating an ammonia consumed amount Mco in the SCR catalyst 13 based on the reaction ratio Rre calculated in the reaction ratio calculating part M3 and the NOx purified amount Mnox calculated in the NOx purified amount calculating part M4, an ammonia supply amount calculating apart MG for calculating an ammonia supply amount Mdo to the SCR catalyst 13, and an ammonia adsorbed amount calculating part M7 for calculating an ammonia adsorbed amount Mad based on the ammonia consumed amount Mco calculated in the ammonia consumed amount calculating part M5 and the ammonia supply amount Mdo calculated in the ammonia supply amount calculating apart M6.

Figure 4:
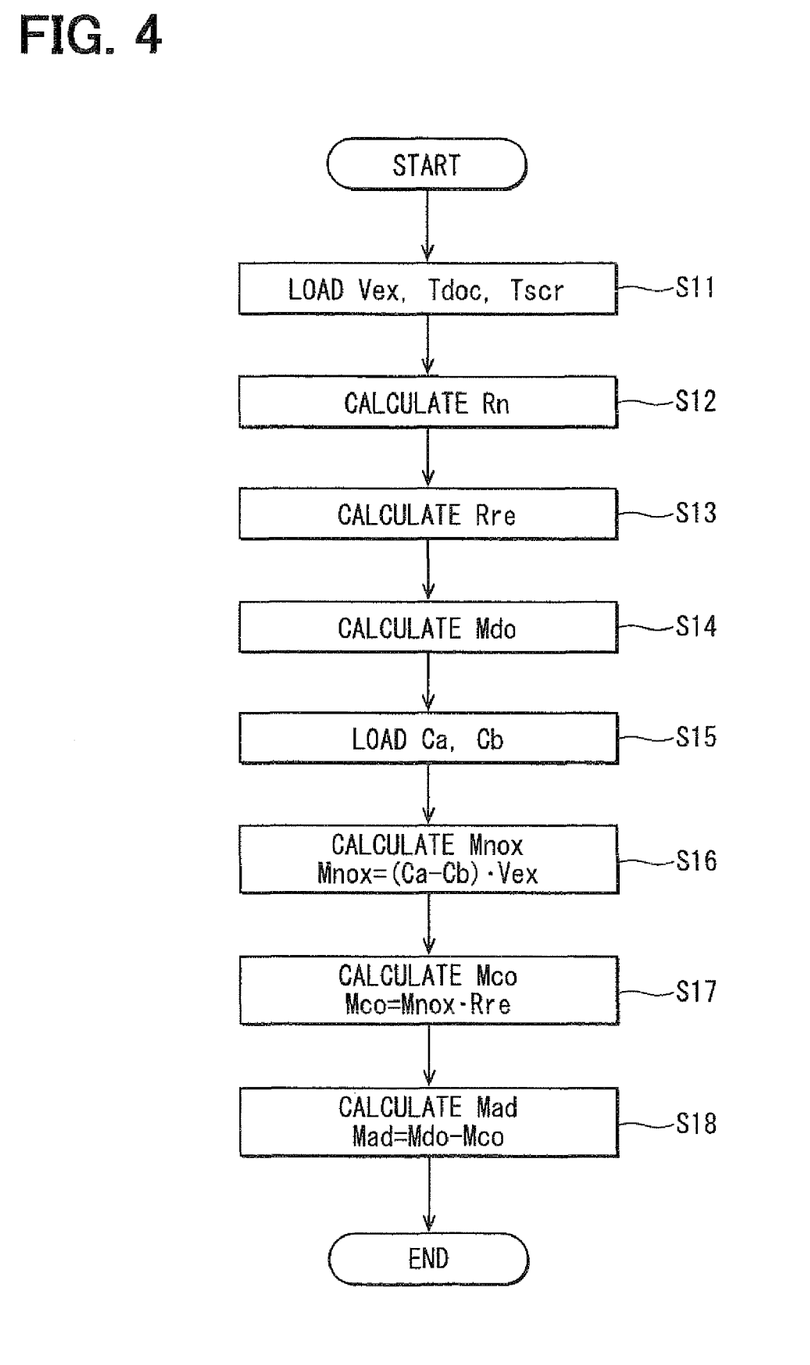
FIG. 4 is a flow chart illustrating processing for the calculation of the ammonia adsorbed amount according to the embodiment.

FIG. 4 is a flow chart illustrating processing for calculating the ammonia adsorbed amount, and this processing is repeatedly performed with a predetermined time period by the ECU 40.

In FIG. 4, at S11, an exhaust gas flow Vex, oxidation catalyst temperature Tdoc, and SCR catalytic temperature Tscr at that time are loaded. In the present embodiment, these parameters (Vex, Tdoc, Tscr) are calculated successively in another processing (not shown), and a newest value of each parameter is loaded one after another at S11. The exhaust gas flow Vex is calculated based on an engine operation condition, and more specifically, calculated based on an engine rotation speed, fuel injection quantity and the like. The oxidation catalyst temperature Tdoc is calculated based on a detection result by the temperature sensor 20 on an upstream side of the oxidation catalyst 12, and the SCR catalytic temperature Tscr is calculated based on a detection result by the temperature sensor 17 on the upstream side of the SCR catalyst 13. With regard to calculation of the exhaust gas flow Vex, a flow rate sensor may be provided in the exhaust pipe 11 to calculate the exhaust gas flow Vex based on a detection result of the flow rate sensor, or the exhaust gas flow Vex may be calculated based on a detection result of an airflow meter provided in an intake pipe.

At S12, the ratio Rn of NO/NO2 is calculated based on the exhaust gas flow Vex and the oxidation catalyst temperature Tdoc. More specifically, the ratio Rn of NO/NO2 is calculated using a map which establishes a relationship among the exhaust gas flow Vex, the oxidation catalyst temperature Tdoc, and the ratio Rn of NO/NO2. Meanwhile, as the exhaust gas flow Vex is larger or as the oxidation catalyst temperature Tdoc is higher, the ratio Rn of NO/NO2 is calculated as a smaller value (since the oxidation reaction of NO→NO2 is promoted).

Figure 5:
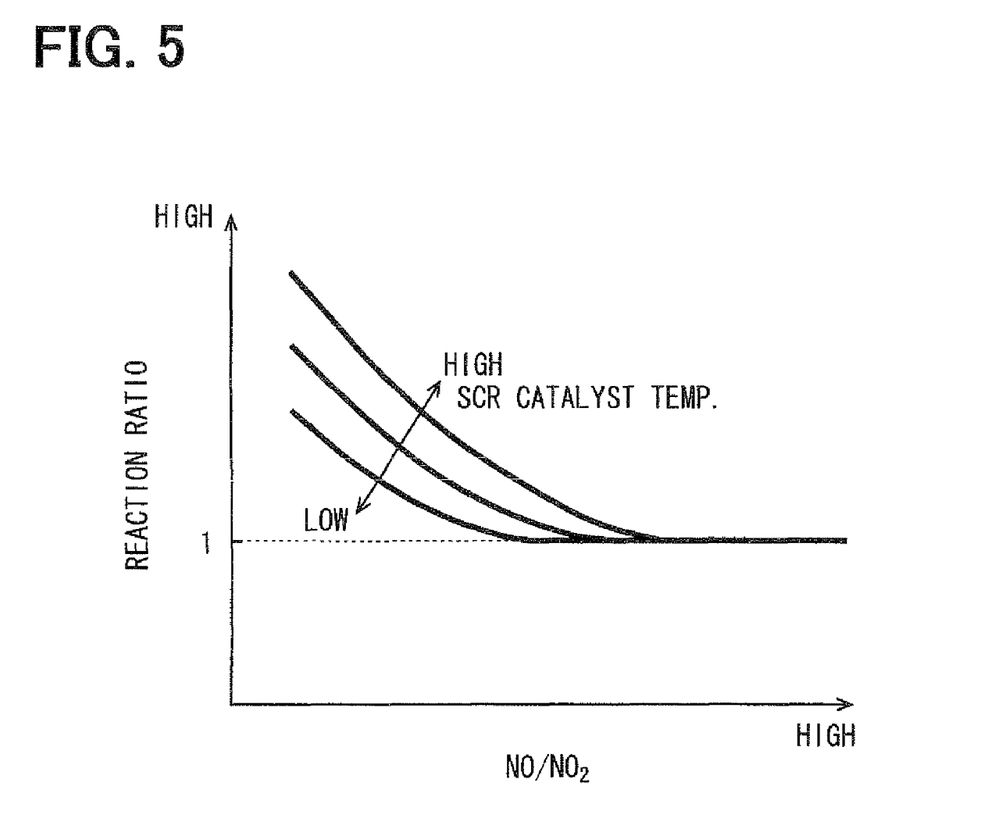
FIG. 5 is a graph illustrating a relationship among a ratio of NO/NO2, the SCR catalytic temperature and a reaction ratio according to the embodiment.

At S13, using a two-dimensional reaction ratio map having a relationship shown in FIG. 5 with the ratio Rn of NO/NO2 and the SCR catalytic temperature Tscr as parameters, the reaction ratio Rre is calculated based on the ratio Rn of NO/NO2 and the SCR catalytic temperature Tscr at that time. Control data obtained by experiment, compatibility and the like, are registered on the reaction ratio map. The relationship shown in FIG. 5 corresponds to the relationship of FIG. 2 described above, and as the ratio Rn of NO/NO2 is smaller or as the SCR catalytic temperature Tscr is higher, a larger value is calculated as the reaction ratio Rre.

When (formula 2) which is a reaction formula for NO and (formula 3) which is a reaction formula for NO2 are compared, the reaction ratio at the time of NOx reduction is larger in the latter. Therefore, the reaction ratio may be calculated as a larger value as the ratio of NO/NO2 is smaller. In other words, the ammonia reaction amount increases as the NO2 amount as opposed to the NO amount is larger, and more ammonia is reacted accordingly during the reduction reaction of (formula 3). Consequently, it is desirable to calculate the reaction ratio in consideration of the above.

With regard to calculation of the reaction ratio Rre, the configuration using the two-dimensional map with the ratio Rn of NO/NO2 and the SCR catalytic temperature Tscr as parameters may be modified to the following configuration (1), (2).

(1) The reaction ratio Rre (base value) is calculated based on the ratio Rn of NO/NO2 at that time using a reaction ratio map with the ratio Rn of NO/NO2 as a parameter, and the reaction ratio Rre is corrected by the SCR catalytic temperature Tscr.

(2) The reaction ratio Rre is calculated based on the SCR catalytic temperature Tscr at that time using a reaction ratio map with the SCR catalytic temperature Tscr as a parameter, and the reaction ratio Rre is corrected by the ratio Rn of NO/NO2.

At S14, the ammonia supply amount Mdo is calculated based on the urea water addition amount by the urea water addition valve 15 at that time.

At S15, upstream NOx concentration Ca which is NOx concentration on the upstream side of the SCR catalyst 13, and downstream NOx concentration Cb which is NOx concentration on the downstream side of the SCR catalyst 13 are loaded. In the present embodiment, the upstream NOx concentration Ca and the downstream NOx concentration Cb are calculated respectively from detection results of the upstream NOx sensor 16 and the downstream NOx sensor 18 in another processing (not shown), and these calculated values are loaded in succession at S15. At S16, the downstream NOx concentration Cb is subtracted from the upstream NOx concentration Ca, and the NOx purified amount Mnox is calculated by multiplying the difference (Ca−Cb) by the exhaust gas flow Vex.

At S17, the ammonia consumed amount Mco is calculated by multiplication of the NOx purified amount Mnox and the reaction ratio Rre. With regard to calculation of the ammonia consumed amount, the NOx purified amount (synonymous with actual NOx reaction amount) in the NOx catalyst is calculated, and the ammonia consumed amount in the NOx catalyst may be calculated based on the reaction ratio each time and the NOx purified amount. Finally, at S18, the ammonia adsorbed amount Mad is calculated by subtracting the ammonia consumed amount Mco from the ammonia supply amount Mdo.

The ammonia adsorbed amount in the NOx catalyst is calculated based on a calculation value of the amount of ammonia consumed each time. The ammonia adsorbed amount in the NOx catalyst is determined by a balance between ammonia supply and ammonia consumption in the NOx catalyst. If accuracy in estimation of the ammonia consumed amount is improved, accuracy of the ammonia adsorbed amount is also improved. In addition, the ammonia supply amount is obtained from the amount of reducing agent added each time by a reducing agent adding means. Because the ammonia adsorbed amount is used as a calculation parameter in calculating the amount of reducing agent added by the reducing agent adding means, control precision of the amount of the added reducing agent is also improved. For instance, the amount of the added reducing agent is controlled so as to maintain the ammonia adsorbed amount in the NOx catalyst at a desired amount.

When the ammonia adsorbed amount Mad is calculated as described above, feedback control of the ammonia adsorbed amount is performed based on the ammonia adsorbed amount Mad (corresponding to an actual adsorbed amount). More specifically, a target value of the ammonia adsorbed amount is set, and based on a difference between the target value and the ammonia adsorbed amount Mad, the urea water addition amount by the urea water addition valve 15 is controlled. If the ammonia adsorbed amount Mad is smaller than the target value, the urea water addition amount is increased. Conversely, if the ammonia adsorbed amount Mad is larger than the target value, the urea water addition amount is decreased. Accordingly, the ammonia adsorbed amount Mad is maintained at the target value, and thereby desired NOx purification performance is maintained.

According to the present embodiment described in detail above, the following excellent effects are produced.

The reaction ratio Rre (ratio of an ammonia reaction amount to an NOx reaction amount) is calculated based on the SCR catalytic temperature Tscr, and based on the reaction ratio Rre, the ammonia consumed amount Mco is calculated. Consequently, the ammonia consumed amount in the SCR catalyst 13 is properly obtained even if the SCR catalytic temperature changes. In this case, by introducing the reaction ratio Rre as a parameter calculation, the ammonia consumed amount Mco is obtained in view of which component of NO and NO2 is reduced and purified in the SCR catalyst 13. Thus, estimation accuracy of the consumed amount Mco is improved. If the estimation accuracy of the ammonia consumed amount Mco is improved, accuracy of the ammonia adsorbed amount Mad is also improved and eventually, the NOx purification is optimized.

More specifically, when the ratio of NO/NO2 of exhaust gas changes, the proportion of the chemical reaction based on each reaction formula (formula 1) to (formula 3) is different, and the reaction ratio in the NOx catalyst varies accordingly.

The reaction ratio Rre is calculated based on the SCR catalytic temperature Tscr and the ratio Rn of NO/NO2, given that the reaction ratio Rre in the SCR catalyst 13 varies with the ratio Rn of NO/NO2 of exhaust gas in addition to the SCR catalytic temperature. Accordingly, calculation accuracy of the reaction ratio Rre is improved.

Since the reaction ratio Rre is calculated using a reaction ratio map with at least one of the SCR catalytic temperature Tscr and the ratio Rn of NO/NO2 as a parameter, the reaction ratio Rre each time is calculated simply and appropriately. In other words, even if the SCR catalytic temperature changes successively, the reaction ratio Rre is suitably obtained.

Because the ratio Rn of NO/NO2 is calculated based on the oxidation catalyst temperature Tdoc, the ratio Rn of NO/NO2 is calculated in view of differences in oxidation reaction of the oxidation catalyst 12 in accordance with a change of the oxidation catalyst temperature Tdoc. Accordingly, the ratio Rn of NO/NO2 is correctly obtained, and eventually, calculation accuracy of the reaction ratio Rre in the SCR catalyst 13 is further improved.

The urea water addition valve 15 corresponds to a "reducing agent adding means", the temperature sensor 17 corresponds to a "catalyst temperature detecting means", the reaction ratio calculating part M3 and the ECU 40 correspond to a "reaction ratio calculating means", the ammonia consumed amount calculating part M5 and the ECU 40 correspond to an "ammonia consumed amount calculating means", the NO/NO2 calculating part M1 and the ECU 40 correspond to an "NO/NO2 calculating means", the temperature sensor 20 corresponds to a "means for detecting temperature Tdoc of the oxidation catalyst 12", and the ammonia adsorbed amount calculating part M7 and the ECU 40 correspond to an "ammonia adsorbed amount calculating means".

OTHER EMBODIMENTS

The present invention is not limited to the description of the above embodiment, and may be embodied, for example, as follows.

- In the above embodiment, the reaction ratio Rre is calculated based on the SCR catalytic temperature Tscr and the ratio Rn of NO/NO2. Alternatively, this may be modified. For instance, the reaction ratio Rre may be calculated based on the SCR catalytic temperature Tscr (i.e., the reaction ratio Rre is calculated without using the ratio Rn of NO/NO2). Or, the reaction ratio Rre may be calculated based on the ratio Rn of NO/NO2 (i.e., the reaction ratio Rre is calculated without using the SCR catalytic temperature Tscr).
- In the above embodiment, the ammonia adsorbed amount is calculated from the ammonia consumed amount, and based on the ammonia adsorbed amount, the urea water addition amount by the urea water addition valve 15 is controlled. Alternatively, this is modified, and the urea water addition amount by the urea water addition valve 15 may be controlled based on the ammonia consumed amount (i.e., the urea water addition amount is controlled without calculating the ammonia adsorbed amount).
- The present invention may be embodied in other than the urea SCR system described above. For instance, the present invention may be embodied in a system in which solid urea is used as a generation source of ammonia, and urea water or ammonia as a reducing agent is generated from the urea, a system in which fuel such as light oil is used as a generation source of ammonia, or a system in which ammonia is directly added to the exhaust passage.

Additional advantages and modifications will readily occur to those skilled in the art. The invention in its broader terms is therefore not limited to the specific details, representative apparatus, and illustrative examples shown and described.

What is claimed is:

1. An exhaust emission control device used for an internal combustion engine and applied to an exhaust gas purifying system including:
   an NOx catalyst disposed in an exhaust passage of the engine, through which exhaust gas flows, so as to promote selective purification of NOx in the exhaust gas performed by ammonia, which is a reducing agent for reducing NOx; and
   a reducing agent adding device configured to add the reducing agent to an upstream side of the NOx catalyst in a flow direction of the exhaust gas, the device comprising:
      a catalyst temperature detector configured to detect a temperature of the NOx catalyst;
      a reaction ratio calculating unit configured to calculate a reaction ratio, which is a ratio of a reaction amount of ammonia to a reaction amount of NOx in the NOx catalyst, based on the temperature of the NOx catalyst detected by the catalyst temperature detector, using pre-registered control data showing a relationship between the temperature of the NOx catalyst and the reaction ratio;
      an NO/NO2 calculating unit configured to calculate an NO/NO2 ratio, which is a ratio between NO and NO2 in the exhaust gas, wherein:
         the reaction ratio calculating unit calculates the reaction ratio based on the temperature of the NOx catalyst detected by the catalyst temperature detector and the NO/NO2 ratio calculated by the NO/NO2 calculating unit;
         the reaction ratio calculating unit calculates the reaction ratio as a large value when the temperature of the NOx catalyst is high;
         the reaction ratio calculating unit calculates the reaction ratio as a large value when the NO/NO2 ratio is small; and
         the reaction ratio is equal to or larger than 1; and
      an ammonia consumed amount calculating unit configured to calculate a consumed amount of ammonia in the NOx catalyst based on the reaction ratio calculated by the reaction ratio calculating unit.

2. The exhaust emission control device according to claim 1, wherein the reaction ratio calculating unit calculates the reaction ratio based on the NO/NO2 ratio using pre-registered control data showing a relationship between the NO/NO2 ratio and the reaction ratio.

3. The exhaust emission control device according to claim 1, wherein the exhaust gas purifying system further includes an oxidation catalyst on the upstream side of the NOx catalyst, the device further comprising a temperature detector of the oxidation catalyst, wherein the NO/NO2 calculating unit calculates the NO/NO2 ratio based on the detected temperature of the oxidation catalyst.

4. The exhaust emission control device according to claim 1, further comprising an ammonia adsorbed amount calculating unit for calculating an adsorbed amount of ammonia in the NOx catalyst based on the consumed amount of ammonia calculated by the ammonia consumed amount calculating unit.

5. A method of controlling exhaust emission of an internal combustion engine, the method comprising:
   disposing an NOx catalyst disposed in an exhaust passage of the engine, through which exhaust gas flows, so as to promote selective purification of NOx in the exhaust gas performed by ammonia, which is a reducing agent for reducing NOx; and
   adding the reducing agent to an upstream side of the NOx catalyst in a flow direction of the exhaust gas;
   detecting temperature of the NOx catalyst;
   calculating a reaction ratio, which is a ratio of a reaction amount of ammonia to a reaction amount of NOx in the NOx catalyst, based on the detected temperature of the NOx catalyst, using pre-registered control data showing a relationship between the temperature of the NOx catalyst and the reaction ratio;
   calculating an NO/NO2 ratio, which is a ratio between NO and NO2 in the exhaust gas;
   calculating the reaction ratio based on the detected temperature of the NOx catalyst and the calculated NO/NO2 ratio;
   calculating the reaction ratio as a large value when the temperature of the NOx catalyst is high;
   calculating the reaction ratio as a large value when the NO/NO2 ratio is small; and
   calculating a consumed amount of ammonia in the NOx catalyst based on the calculated reaction ratio;
   wherein the reaction ratio is equal to or larger than 1.

6. The method of claim 5, wherein the reaction ratio is calculated based on the NO/NO2 ratio using pre-registered control data showing a relationship between the NO/NO2 ratio and the reaction ratio.

7. The method of claim 5, wherein the NO/NO2 ratio is calculated based on a detected temperature of an oxidation catalyst on the upstream side of the NOx catalyst.

8. The method of claim 5, further comprising calculating an adsorbed amount of ammonia in the NOx catalyst based on the calculated consumed amount of ammonia.

* * * * *